United States Patent [19]

Tacke et al.

[11] Patent Number: 4,841,000

[45] Date of Patent: Jun. 20, 1989

[54] PROCESS FOR THE PREPARATION OF AROMATIC POLYESTERS

[75] Inventors: Peter Tacke, Krefeld; Ulrich Grogp, Kempen; Karsten-Josef Idel, Krefeld, all of Fed. Rep. of Germany

[73] Assignee: Bayer Aktiengesellschaft, Leverkusen-Bayerwerk, Fed. Rep. of Germany

[21] Appl. No.: 258,803

[22] Filed: Oct. 17, 1988

[30] Foreign Application Priority Data

Oct. 29, 1987 [DE] Fed. Rep. of Germany ....... 3736650

[51] Int. Cl.$^4$ .......................................... C07D 203/18
[52] U.S. Cl. .................................... 525/437; 525/448; 528/176; 528/194; 528/271
[58] Field of Search ................ 525/437, 448; 528/176, 528/194, 271

[56] References Cited

U.S. PATENT DOCUMENTS 4,052,384 10/1977 Dockner et al. .................... 528/292

Primary Examiner—Harold D. Anderson
Assistant Examiner—T. Mason
Attorney, Agent, or Firm—Connolly and Hutz

[57] ABSTRACT

The preparation of aromatic polyesters based on diphenols and iso- and terephthalic acid is carried out by solventfree transesterification of esters of the diphenols with the aromatic dicarboxylic acids, the esters of the diphenols being initially reacted with teriphthalic acid alone and subsequently reacted with isophthalic acid after at least 80% of the terephthalic acid has undergone reaction.

7 Claims, No Drawings

PROCESS FOR THE PREPARATION OF AROMATIC POLYESTERS

This invention relates to a process for the preparation of aromatic polyesters based on aromatic diphenols and iso- and terephthalic acid by solvent-free trans-esterification of esters of the diphenols with the aromatic dicarboxylic acids.

The preparation of polyarylates by solvent-free trans-esteriification by the acetate process in the reaction of bisphenol diacetates with mixtures of iso- and terephthalic acid is known. This reaction is made very difficult by the tendency of the two aromatic dicarboxylic acids, especially terephthalic acid, to sublime. The sublimate will not fuse and rapidly blocks up the inlet and outlet pipes of the reaction apparatus.

It has been proposed, for example in U.S. Pat. No. 3,948,856 and in European Offenlegungsschrift 26 121, to prevent or inhibit sublimation by carrying out the trans-esterification in the presence of an inert, highboiling solvent such as diphenylether. Although such a solvent is highly effective in suppressing sublimation, it has been found that complete separation of this solvent from the polyesters is extremely difficult and time consuming.

A process has now been found for the preparation of aromatic polyesters based on diphenols and iso- and terephthalic acid by the solvent-free trans-esterification of esters of diphenols with aromatic dicarboxylic acids, which is characterised in that the esters of the diphenols are initially reacted only with the terephthalic acid, and the isophthalic acid is added to the solvent free reaction mixture after at least 70% of the terephthalic acid has undergone reaction.

In the process according to the invention, the terephthalic acid is generally reacted in the presence of a stoichiometric excess of the ester of the diphenol, i.e. about 0.1 to 0.96 mol of terephthalic acid, preferably 0.3 to 0.8 mol are used per mol of the diphenolester.

The solvent-free trans-esterification of diphenolesters with the aromatic dicarboxylic acids is generally carried out at temperatures of about 200° to 350° C., preferably at 230° to 300° C. The quantity of isophthalic acid added to the solvent-free reaction mixture is generally about 90 to 5 mol-%, preferably 70 to 20 mol-% (based on the total quantity of acids).

In the process according to the invention, the isophthalic acid is preferably added to the solvent-free reaction mixture when 80 to 100% of the terephthalic acid put into the process has undergone reaction with the esters of the diphenols.

The bis-phenols used for the preparation of the aromatic polyesters may be. for example, the same as those described in DE-OS No. 2 940 024. Bisphenol-A (BPA: 2.2-bis-4-hydroxy-phenyl-propane) is preferably used.

The preparation of esters of diphenols, e.g. diphenol diacetates, is known. Bisphenol diacetates may be prepared, for example, by the reaction of bisphenols with acetic acid anhydride as described in European Specification Nos. 26 121, 26 684 and 28 030. The bisphenol diacetates may also be prepared in the presence of terephthalic acid.

The solvent-free trans-esterification according to the invention may be carried out with or without catalysts. It is advantageous to add metal compounds in quantities of up to 3% by weight, based on the quantity of diphenols, to accelerate the trans-esterification. The quantities of metal compounds added are preferably from 0.001 to 1% by weight, based on the quantity of diphenols put into the process. The following are examples of metal compounds which may be used as catalysts: Zinc acetate, magnesium acetate, tetraisopropyl titanate and diethyl stannate.

Since the aromatic polyesters have high fusion viscosities. it is difficult to prepare them in glass flasks or steel vessels equipped with stirrers. It is therefore preferable to use such stirrer apparatus only for the preparation of easily stirrable precondensates or oligomers with relative solution viscosities of about 1.06 to 1.15 (determined on a solution of 0.5 g of the ester in 100 ml of solution at 25° C., using $CH_2Cl_2$ or 1:1-mixtures of phenol and o-dichlorobenzene as solvent). Further condensation may then be carried out, for example, in the solvent-free state in a vacuum extruder or in the case of very small quantities it may be carried out in the laboratory in a glass flask with a powerful stirrer. After-condensation may also be carried out in the solid phase. The prepared aromatic polyesters generally have relative solution viscosities of from 1.18 to 2.0, preferably from 1.2 to 1.6 (determined in the above-mentioned solvents).

The aromatic polyesters prepared by the process according to the invention may be worked up in conventional processing machines to produce semi-finished goods by extrusion or moulded parts by injection moulding. The polyarylates may also be added to other polymers to improve their properties.

EXAMPLE 1

Preparation of a polyarylate of bisphenol A and equimolar quantities of iso- and terephthalic acid 34.2 g (0.15 mol) of bisphenol-A and 33.7 g (0.33 mol) of acetic anhydride were introduced into a three-necked flask equipped with stirrer, a Vigreux column 20 cm in length and a distillation bridge and the reaction mixture was refluxed for half an hour under nitrogen. The acetic acid formed in the reaction distilled over. The excess acetic anhydride was distilled off at 100 mbar and a sum temperature of 130° C.

12.71 g (0.0765 mol) of terephthalic acid were added to the resulting BPA diacetate and stirring was continued at normal pressure and at 20° C. under nitrogen. Acetic acid again distilled over. The reaction temperature was continuously raised to 260° C. over a period of 3.5 hours. During this time, the sublimate which formed on the wall of the flask above the heating bath was melted with a hot air generator at intervals of one hour.

When the temperature reached 260° C., the reaction mixture was cooled to 240° C. and 12.71 g (0.0765 mol) of isophthalic acid were added. The temperature was then raised to 320° C. within 5 hours. A vacuum of 20 mbar was applied when the temperature reached 280° C.

The sublimate could also easily be melted from the wall of the flask during condensation of the isophthalic acid.

When the temperature reached 320° C., the melt had become highly viscous. It could no longer be displaced by means of the glass stirrer used. Condensation was therefore stopped. The product obtained was readily soluble in methylene chloride. The relative solution viscosity (determined on a $CH_2Cl_2$ solution at 25° C.) was 1.13. The polyester was still brittle and therefore easily ground. 20 g of the resulting polyester were stirred with a steel stirrer in a glass flask for 2.5 hours at 340° C. under nitrogen. The relative viscosity ($\eta_{rel}$) of the product rose to 1.3767 during this time.

For comparison, a similar experiment was carried out but the two dicarboxylic acids were simultaneously added to the BPA diacetate and the temperature was continuously raised to 320° C. within 7 hours. In this case, the sublimate could no longer be melted. Since sublimation reduced the quantity of aromatic dicarboxylic acids in the melt, a sufficiently high molecular weight could not be obtained ($\eta_{rel}=1.234$ after the after-condensation).

EXAMPLE 2

Preparation of a polyarylate of bisphenol-A and iso- and terephthalic acid in proportions of 30:70

The procedure was the same as described in Example 1. 17.8 g (0.107 mol) of terephthalic acid were added to the diacetate initially obtained and in this case the temperature was raised to 275° C. within 3.5 hours.

7.63 g (0.046 mol) of isophthalic acid were then added and the subsequent procedure was carried out as described in Example 1. The polyester obtained had a relative solution viscosity (this time measured in phenol/odichlorobenzene as solvent) of 1.126, increasing to 1.385 after the after-condensation.

The sublimate could again be melted but in a comparison experiment with simultaneous addition of both dicarboxylic acids, it could not. After-condensation raised the $\eta_{rel}$ value to only 1.228.

We claim:

1. Process for the preparation of aromatic polyesters based on aromatic diphenols and iso- and terephthalic acid by solvent-free trans-esterification of esters of the diphenols with the aromatic dicarboxylic acids, characterised in that the esters of the diphenols are first reacted with the terephthalic acid alone, and the isophthalic acid is added to the solvent-free reaction mixture after at least 70% of the terephthalic acid put into the process has undergone reaction.

2. Process according to claim 1, characterised in that the esters used are the diacetates of the diphenols.

3. Process according to claim 1, characterised in that the ester of the diphenol used is bisphenol-A diacetate.

4. Process according to claim 1 characterised in that the isophthalic acid is added to the solvent-free reaction mixture when 80 to 100% of the terephthalic acid put into the process has undergone reaction.

5. Process according to claim 2, characterized in that the ester of the diphenol used is bisphenol-A diacetate.

6. Process according to claim 4, characterized in that the esters used are the diacetates of the diphenols.

7. Process according to claim 4, characterized in that the ester of the diphenol used is bisphenol-A diacetate.

* * * * *